US010984688B2

(12) United States Patent
Cantwell et al.

(10) Patent No.: US 10,984,688 B2
(45) Date of Patent: Apr. 20, 2021

(54) TUBULAR DISPLAY

(71) Applicant: MID-WEST METAL PRODUCTS COMPANY, INC., Muncie, IN (US)

(72) Inventors: Brad Cantwell, Muncie, IN (US); Stew Kerr, Muncie, IN (US); David J. Nolley, Muncie, IN (US); Michael E. Greene, Muncie, IN (US)

(73) Assignee: Mid-West Metal Products Company, Inc., Muncie, IN (US)

(*) Notice: Subject to any disclaimer, the term of this patent is extended or adjusted under 35 U.S.C. 154(b) by 0 days.

(21) Appl. No.: 16/401,278

(22) Filed: May 2, 2019

(65) Prior Publication Data

US 2019/0340960 A1 Nov. 7, 2019

Related U.S. Application Data

(60) Provisional application No. 62/666,088, filed on May 2, 2018.

(51) Int. Cl.
*A47F 5/00* (2006.01)
*A47F 7/00* (2006.01)
(Continued)

(52) U.S. Cl.
CPC ............ *G09F 9/3023* (2013.01); *A47B 96/04* (2013.01); *A47F 5/005* (2013.01); *A47F 5/0006* (2013.01); *A47F 5/0081* (2013.01); *A47F 5/01* (2013.01); *A47F 5/0807* (2013.01); *A47F 5/0838* (2013.01); *A47F 5/0876* (2013.01); *A47F 5/103* (2013.01); *A47F 5/132* (2013.01); *A47F 7/0021* (2013.01); *A47F 7/0042* (2013.01);
(Continued)

(58) Field of Classification Search
CPC .. A47F 7/30; A47F 5/005; A47F 7/144; A47F 7/0021; A47F 7/0028; A47F 7/0035; A47F 7/0042; A47F 5/101; A47F 5/103; A47F 5/108; A47F 5/13; A47F 5/132; A47F 7/12; A47F 7/24; A47F 5/10; A47F 5/0006; A47F 5/08; A47F 5/0081; A47F 5/0031; A47F 5/01; A47F 5/0807; A47F 5/0838; A47F 5/0876; A47B 45/00; A47B 96/025; A47B 96/067; A47B 61/02; A47B 57/58; A47B 57/581; A47B 65/15; A47B 96/04; A47G 25/0664; A47G 25/0671; A47G 25/0685; D06F 57/04
USPC ...... 211/99, 100, 101, 106, 106.01, 184, 45, 211/85.7, 2, 124, 193, 197, 57.1, 59.1, 211/182, 171, 87.01, 175, 43, 41.15, 211/41.14
See application file for complete search history.

(56) References Cited

U.S. PATENT DOCUMENTS 283,728 A * 8/1883 Ward ................. A47G 25/0685
211/100
814,980 A * 3/1906 McCloskey et al. ..... A47F 7/30
211/27

(Continued)

*Primary Examiner* — Jennifer E. Novosad
(74) *Attorney, Agent, or Firm* — Taft Stettinius & Hollister LLP; Stephen F. Rost

(57) ABSTRACT

One embodiment is a display apparatus kit that has a wall support configured to be selectively coupled to a wall and at least one tubular divider configured to be coupled to the wall support. Wherein, the divider is coupled to the wall support to define a slot, the slot is sized to receive and maintain merchandise in an orientation that is beneficial to a user.

17 Claims, 13 Drawing Sheets

(51) Int. Cl.
  *A47F 5/08* (2006.01)
  *A47G 25/06* (2006.01)
  *A47F 5/13* (2006.01)
  *A47B 96/04* (2006.01)
  *A47F 5/10* (2006.01)
  *A47F 5/01* (2006.01)
  *G09F 9/302* (2006.01)
  *G06F 3/14* (2006.01)
  *F16M 13/02* (2006.01)

(52) U.S. Cl.
  CPC ......... *A47G 25/0664* (2013.01); *F16M 13/02* (2013.01); *G06F 3/1446* (2013.01); *G09F 9/3026* (2013.01)

(56) References Cited

U.S. PATENT DOCUMENTS

| | | | | |
|---|---|---|---|---|
| 916,496 | A * | 3/1909 | Shindlebower | A47F 7/163 211/47 |
| 1,580,744 | A * | 4/1926 | Lyon | A47F 5/13 211/182 |
| 1,698,318 | A * | 1/1929 | Norton | B25H 3/04 211/182 |
| 2,087,149 | A | 7/1937 | Hendrix | |
| D134,111 | S | 10/1942 | Bersin et al. | |
| 2,311,932 | A * | 2/1943 | Deckard | E21B 19/14 211/70.4 |
| 2,760,647 | A * | 8/1956 | Saul, Jr. | A47B 57/30 211/85.8 |
| 2,812,068 | A * | 11/1957 | Lord | D06F 57/12 211/100 |
| 2,920,765 | A * | 1/1960 | Royer | D06H 3/165 211/10 |
| 2,998,886 | A * | 9/1961 | Sides | A47F 5/01 211/133.5 |
| 3,130,439 | A * | 4/1964 | Bovaird | B05C 13/00 15/268 |
| 3,184,068 | A | 5/1965 | Wende | |
| 3,315,813 | A * | 4/1967 | Schneider | A47F 7/16 211/1.51 |
| 3,330,418 | A * | 7/1967 | Schneider | A47F 7/16 211/47 |
| D216,548 | S | 2/1970 | James | |
| 3,779,394 | A | 12/1973 | Bard | |
| 3,782,558 | A | 1/1974 | Schael, Jr. | |
| 4,256,043 | A | 3/1981 | Ovitz, III | |
| 4,316,547 | A * | 2/1982 | Varon | A47G 25/0692 211/105.1 |
| 4,367,819 | A * | 1/1983 | Lewis | A47G 25/0678 211/106.01 |
| 4,501,369 | A * | 2/1985 | Fox | A47F 5/103 108/147.12 |
| 4,503,979 | A * | 3/1985 | Morand | B42F 15/06 211/45 |
| 4,634,010 | A * | 1/1987 | Otema | A47F 7/24 211/103 |
| 4,856,661 | A * | 8/1989 | Guillen | A47F 5/0876 211/100 |
| 4,884,702 | A | 12/1989 | Rekow | |
| 4,936,471 | A * | 6/1990 | Walter | A47F 5/106 211/182 |
| 4,936,565 | A * | 6/1990 | Fredrickson | A47F 5/0807 211/59.1 |
| 5,228,578 | A * | 7/1993 | Wu | A47B 65/20 211/175 |
| 5,257,794 | A * | 11/1993 | Nakamura | B62B 3/00 211/182 |
| 5,303,630 | A | 4/1994 | Metcalf | |
| 5,303,830 | A * | 4/1994 | Metcalf | A47F 5/0807 211/103 |
| 5,472,103 | A | 12/1995 | Merl | |
| 5,520,292 | A * | 5/1996 | Lombardi | A47F 7/00 211/182 |
| 5,526,941 | A * | 6/1996 | Ford | A47F 5/0869 211/103 |
| 5,649,631 | A * | 7/1997 | Loflin | A47F 7/175 211/168 |
| 5,711,436 | A * | 1/1998 | Moeller | A47G 23/0208 211/106 |
| 6,039,228 | A * | 3/2000 | Stein | B60R 9/06 224/532 |
| 6,161,708 | A * | 12/2000 | Myler | A47F 5/0031 211/106 |
| 6,390,308 | B1 * | 5/2002 | Ebrahim | A47F 7/19 211/85.3 |
| 6,669,213 | B2 * | 12/2003 | Woerner | B62B 3/002 280/47.35 |
| 6,681,940 | B1 * | 1/2004 | Cash | B25H 3/04 211/70.6 |
| 6,786,340 | B2 * | 9/2004 | Ford | A47F 5/0815 211/103 |
| 6,860,456 | B2 * | 3/2005 | Magnusson | A47B 47/027 248/215 |
| 6,913,156 | B1 * | 7/2005 | Wolff | A47B 57/586 211/184 |
| 7,150,361 | B2 * | 12/2006 | Calleja | A47F 7/0021 211/49.1 |
| 7,900,783 | B2 | 3/2011 | Fernandez | |
| 8,210,370 | B2 * | 7/2012 | Botkin | A47F 5/0892 211/117 |
| 8,276,771 | B2 * | 10/2012 | Schuetz | E04H 4/14 211/123 |
| 8,439,207 | B2 * | 5/2013 | Currin | A47F 5/0838 211/106.01 |
| 8,602,228 | B1 * | 12/2013 | Martinez | A47F 5/0093 211/100 |
| 9,468,312 | B2 * | 10/2016 | Denby | A47F 5/0043 |
| 9,492,040 | B1 * | 11/2016 | Rendon | A47K 10/04 |
| D773,856 | S | 12/2016 | Cantwell | |
| 9,955,782 | B2 * | 5/2018 | Rue | A47B 81/00 |
| 10,021,996 | B2 | 7/2018 | Cantwell et al. | |
| 10,118,678 | B2 * | 11/2018 | Dias | B63B 32/80 |
| 10,477,992 | B1 * | 11/2019 | Merschman | A47F 5/135 |
| 2003/0155319 | A1 * | 8/2003 | Wishart | A47F 5/13 211/189 |
| 2004/0238465 | A1 * | 12/2004 | Mercure | A47F 7/0042 211/41.14 |
| 2006/0131249 | A1 * | 6/2006 | Kostigian | G09F 5/00 211/45 |
| 2006/0196838 | A1 * | 9/2006 | Mercure | B65G 49/062 211/41.1 |
| 2007/0068887 | A1 * | 3/2007 | Nawrocki | B25H 3/04 211/70.6 |
| 2009/0250416 | A1 * | 10/2009 | Chookang | B65D 85/48 211/41.14 |
| 2010/0072154 | A1 * | 3/2010 | Johnson | B60R 7/02 211/184 |
| 2010/0314341 | A1 * | 12/2010 | Bailey | A47B 23/043 211/43 |
| 2014/0032447 | A1 * | 1/2014 | Fisher | G06Q 90/00 705/500 |
| 2015/0027972 | A1 * | 1/2015 | Andersson | A47B 57/485 211/94.01 |
| 2015/0076312 | A1 * | 3/2015 | Angvall | A47F 5/0081 248/469 |
| 2018/0005552 | A1 * | 1/2018 | Lapp | G09F 7/10 |
| 2019/0246792 | A1 * | 8/2019 | Jarr | B65G 1/04 |
| 2019/0340960 | A1 | 11/2019 | Cantwell | G09F 9/3023 |

* cited by examiner

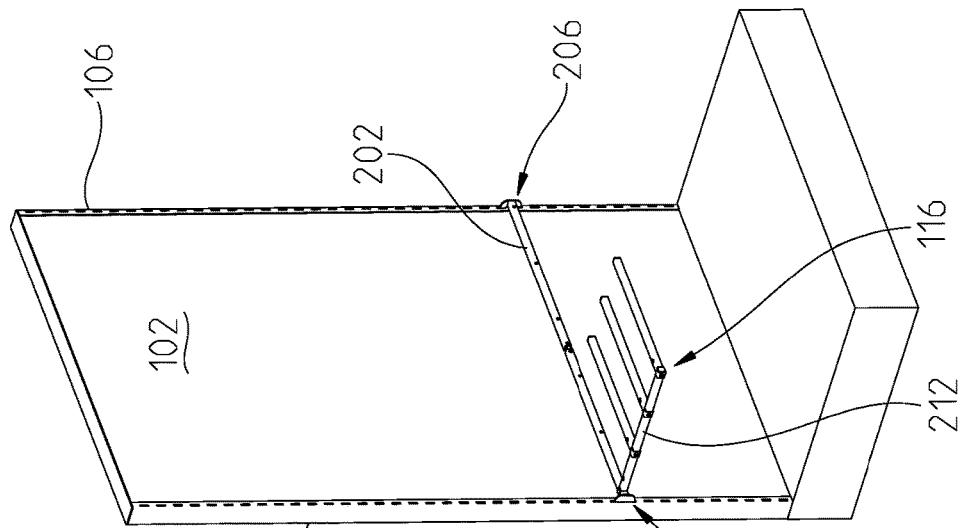
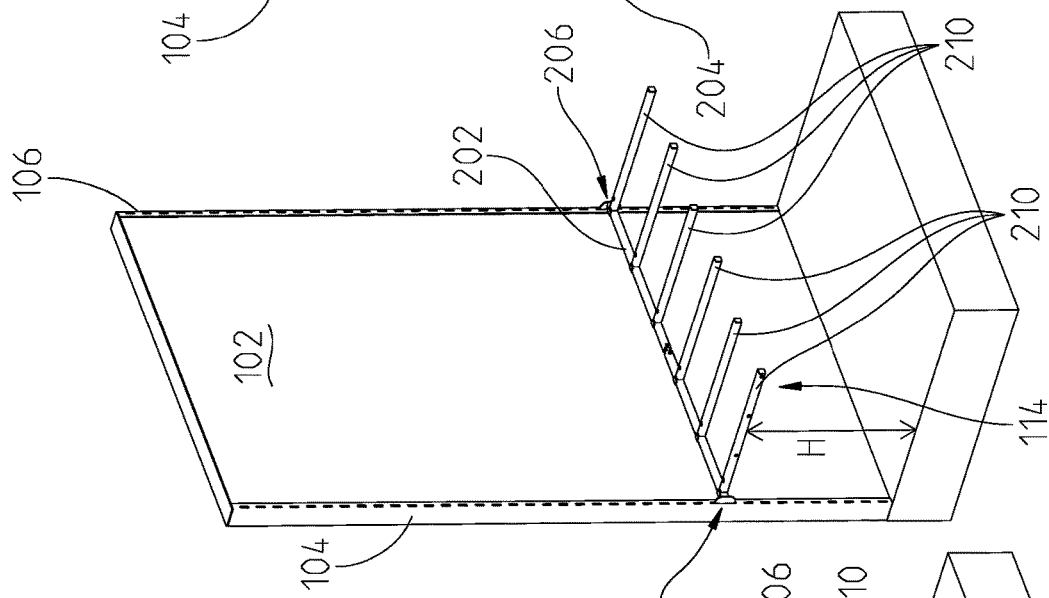
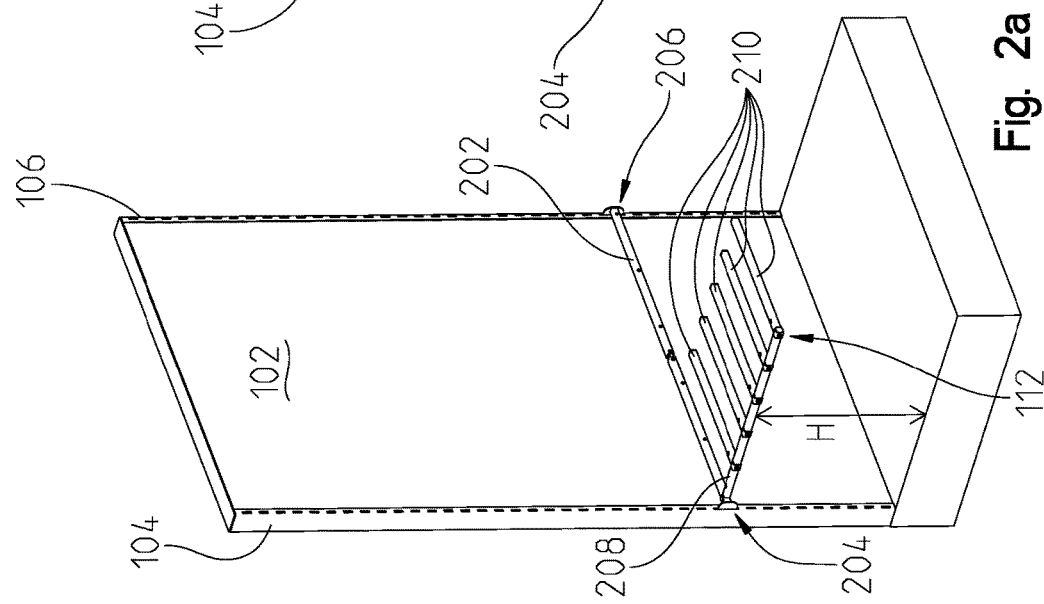

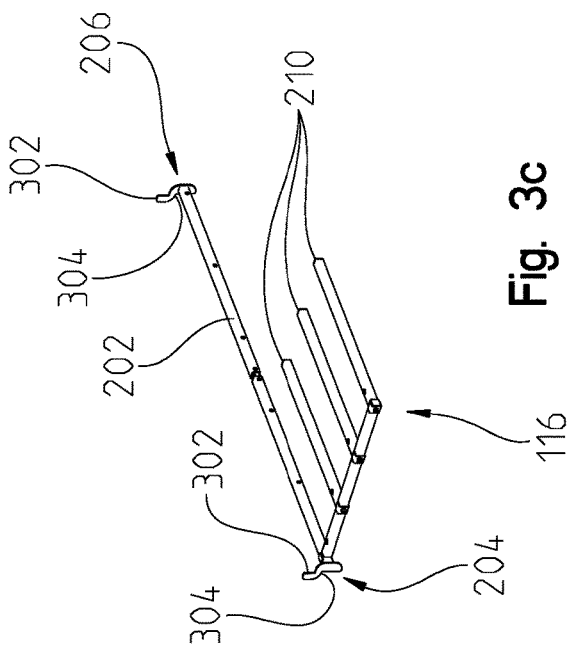
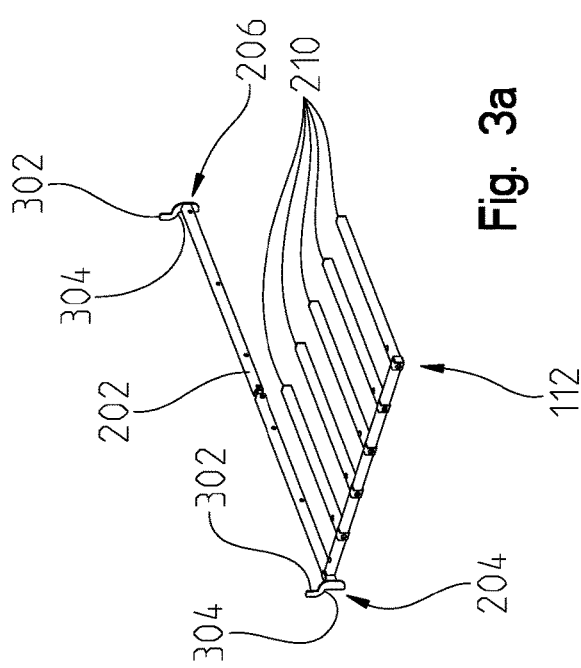
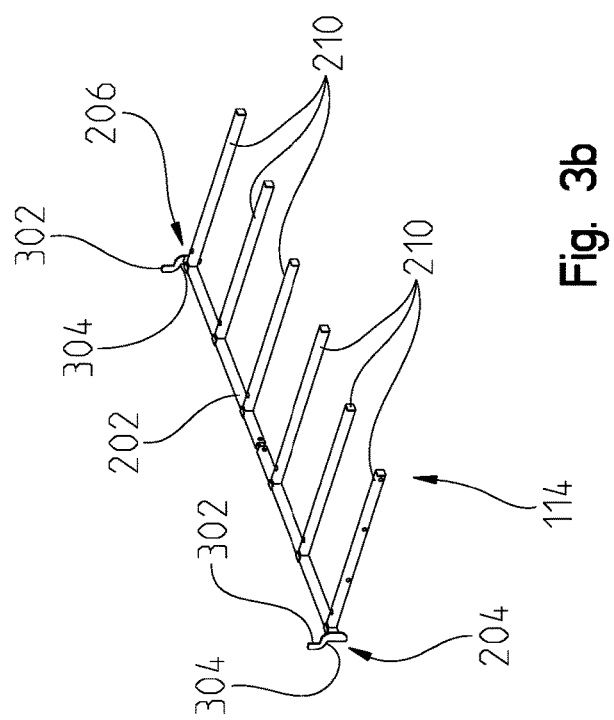

TUBULAR DISPLAY

CROSS-REFERENCE TO RELATED APPLICATIONS

The present disclosure claims the benefit to U.S. Provisional Application No. 62/666,088, filed May 2, 1018 and titled "TUBULAR DISPLAY", the contents of which are hereby incorporated herein in entirety.

TECHNICAL FIELD

The present teachings are related to an apparatus for displaying merchandise, and more particularly to an apparatus having multiple display orientations.

BACKGROUND

It is common practice for commercial and retail stores to use large shelving units to display the products that are sold. The shelving units often consist of a strong center member or wall that goes along the length of the aisle. The center member can act as a base for connecting many various shelving attachments. The shelving attachments are used to create a flat surface to set products on top of. Further, a hook or rail structure can be used to provide a means for hanging products on display from the center member.

The center member or wall must be adequately supported to prevent the center member from falling into the aisle. This is usually achieved by having a strong base section that provides support to the center member. The center member is also usually supported at the ends of the aisles by a second wall that is perpendicular to the center member. This second wall is often as wide as a longitudinal cross section of the shelving system and provides for additional support to keep the center member from becoming unstable.

In addition to providing needed support to the center member, the second wall is also an ideal space for displaying products. The second wall creates more exposure for a product than would the shelves along the center member because shoppers often walk along the exterior of the aisles prior to choosing an aisle that may contain the product they are looking for. From a marketing standpoint, displaying products on the second wall is ideal because it increases the exposure of the product to the customer.

With regards to animal beds or other similar products, using shelving along the aisle is not ideal. The animal beds are often too large to easily fit on the shelves. While the animal beds may be organized in an aesthetically pleasing fashion when the store opens, after consumers begin to remove the animal beds from the shelves they can become disorganized and hard to view. The current method of displaying animal beds is not ideal because it reduces the consumer's exposure to the animal bed by locating it on shelves within the aisles and it often results in a messy product display as consumers rummage through the various animal bed products.

SUMMARY

One embodiment is a display apparatus kit that has a wall support configured to be selectively coupled to a wall and at least one divider having a tubular cross-section and configured to be coupled to the wall support. Wherein, the divider is coupled to the wall support to define a slot, the slot is sized to receive and maintain merchandise in an orientation that is beneficial to a user.

In one example, the at least one divider is coupled to the wall support through an extension arm. In another example, the divider is coupled to the wall support with a divider base that defines a longitudinal through hole defined along a longitudinal axis of the divider and a transvers through hole defined along a transverse axis of the divider. In one aspect of this example, a base fastener couples the divider base to the wall support through an enforcement member.

In yet another example, the divider is positionable in either a perpendicular configuration or a parallel configuration relative to the wall support. In another example, the wall support has a first and second coupling section that are coupleable to a first and second rail of a wall.

Another embodiment is a display assembly kit that has a wall support section configured to be coupled to a wall, a plurality of tubular dividers, and an extension arm. Wherein, the plurality of dividers are coupleable to the wall support section to extend perpendicularly therefrom to provide at least one slot between adjacent dividers in a first configuration and the extension arm is coupleable to the wall support section to extend perpendicularly from the wall support section and the plurality of dividers are coupleable to the extension arm to extend from the extension arm to be substantially parallel to the wall support section to provide at least one slot between adjacent dividers in a second configuration. Further wherein, at least some of the plurality of dividers are used in both the first configuration and the second configuration.

One example of this embodiment has an enforcement member positioned at least partially around the wall support section at an extension arm coupling location. One aspect of this example has a divider base that is positionable within, and coupleable to, the extension arm on one end, wherein a first fastener is positionable through the enforcement member and into the divider base to couple the extension arm to the wall support section. Part of this aspect has a second fastener that is positionable through a wall of the extension member and into the divider base to couple the extension member to the divider base. Wherein the first fastener and the second fastener define axes that a substantially perpendicular to one another when the first and second fastener are coupled to the divider base.

Yet another example has a reinforcement plate that is coupleable to the extension arm on one end and to the wall support section on the other end, wherein the reinforcement plate has a cutout section and a portion of the enforcement member is located in the cutout section when the extension arm is coupled to the wall support section.

Another example of this embodiment has a divider base that is positionable within, and coupleable to, the extension arm on one end to couple the extension arm to the wall support section, a second fastener that is positionable through a wall of the extension member and into the divider base to couple the extension member to the divider base, and a reinforcement plate that is coupleable to the extension arm on one end and to the wall support section on the other end. Wherein the reinforcement plate is coupleable to the extension arm with the second fastener. In another example, the second configuration has at least a first orientation and a second orientation, wherein the extension arm is coupleable to an end portion of the wall support section in the first orientation and the extension arm is coupleable to an inner section of the wall support section in a second orientation. In one aspect of this example, the plurality of dividers are coupleable to either a first side or a second side of the extension arm when the extension arm is in the second orientation to position the at least one slot towards either the first side or the second side of the extension arm.

In yet another example, the wall support section is comprised of a first section and a second section that are coupleable to one another at one end and coupleable to the wall at the other end, wherein the first a second section are coupleable to one another with an extension support. One aspect of this example has a divider base that is positionable within, and coupleable to, the extension arm on one end to couple the extension arm to the wall support section, a first fastener positionable through the wall support section and extension support and into the divider base to couple the extension arm to the wall support section, a second fastener that is positionable through a wall of the extension member and into the divider base to couple the extension member to the divider base and a reinforcement plate that is coupleable to the extension arm on one end and to the wall support section on the other end. Wherein the reinforcement plate is coupleable to the extension arm with the second fastener.

Yet another embodiment is a kit for assembling a display having slots positionable in multiple orientations. The kit includes a wall support section that is configured to be coupled to a substantially vertical surface, an extension arm that is selectively coupleable to the wall support section, and a plurality of tubular dividers that are coupleable to either the wall support section or the extension arm. Wherein, the plurality of dividers extend perpendicularly from the wall support section when coupled directly thereto to define at least one slot between adjacent dividers. Further wherein, the plurality of dividers extend substantially parallel to the wall support section when coupled to the extension arm to define at least one slot between adjacent dividers.

One example of this embodiment has a plurality of divider bases that are selectively coupleable to the dividers to provide a coupling location for the dividers and either the wall support section or the extension arm, wherein each divider base has a longitudinal partial through hole defined therein to receive a first fastener to couple the divider base to either the wall support section or the extension arm and a mid-section through hole defined therein to receive a second fastener to couple the divider base to the corresponding divider, the mid-section through hole being defined along an axis that is substantially perpendicular to a longitudinal axis defined by the longitudinal partial through hole. In one aspect of this example one of the plurality of divider bases selectively couples the extension arm to the wall support section.

DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 2a is a perspective view of the embodiment of FIG. 1a with the merchandise removed;

FIG. 2b is a perspective view of the embodiment of FIG. 1b with the merchandise removed;

FIG. 2c is a perspective view of the embodiment of FIG. 1c with the merchandise removed;

FIG. 3a is an isolated view of a spacer assembly from the embodiment of FIG. 1a;

FIG. 3b is an isolated view of a spacer assembly from the embodiment of FIG. 1b;

FIG. 3c is an isolated view of a spacer assembly from the embodiment of FIG. 1c;

FIG. 4a is a detailed view of the spacer assembly of FIG. 1a;

Corresponding reference numerals are used to indicate corresponding parts throughout the several views.

DETAILED DESCRIPTION

The above-mentioned aspects of the present application and the manner of obtaining them will become more apparent and the teachings of the present application itself will be better understood by reference to the following description of the embodiments of the present application taken in conjunction with the accompanying drawings.

Figure 1C:
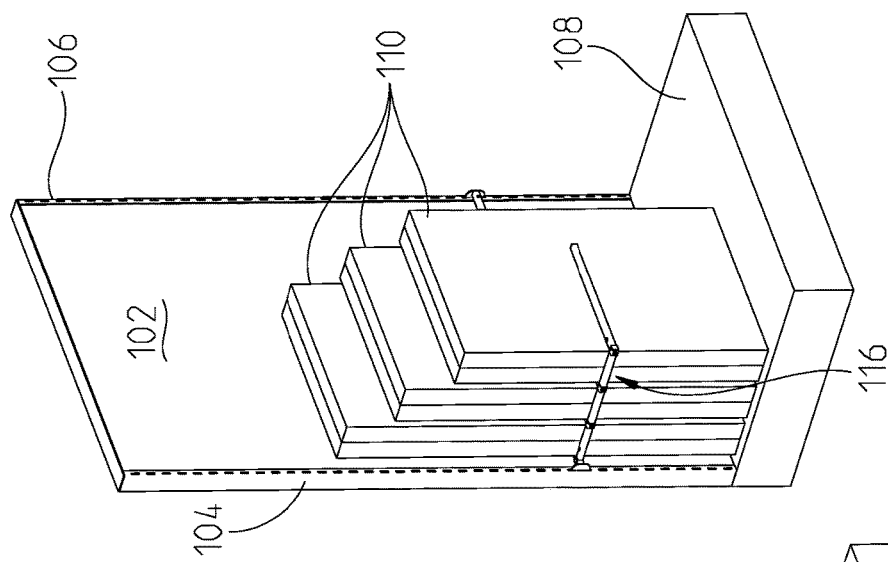
FIG. 1c is a perspective view of another embodiment of a wall display apparatus displaying merchandise in a third configuration.
Figure 1B:
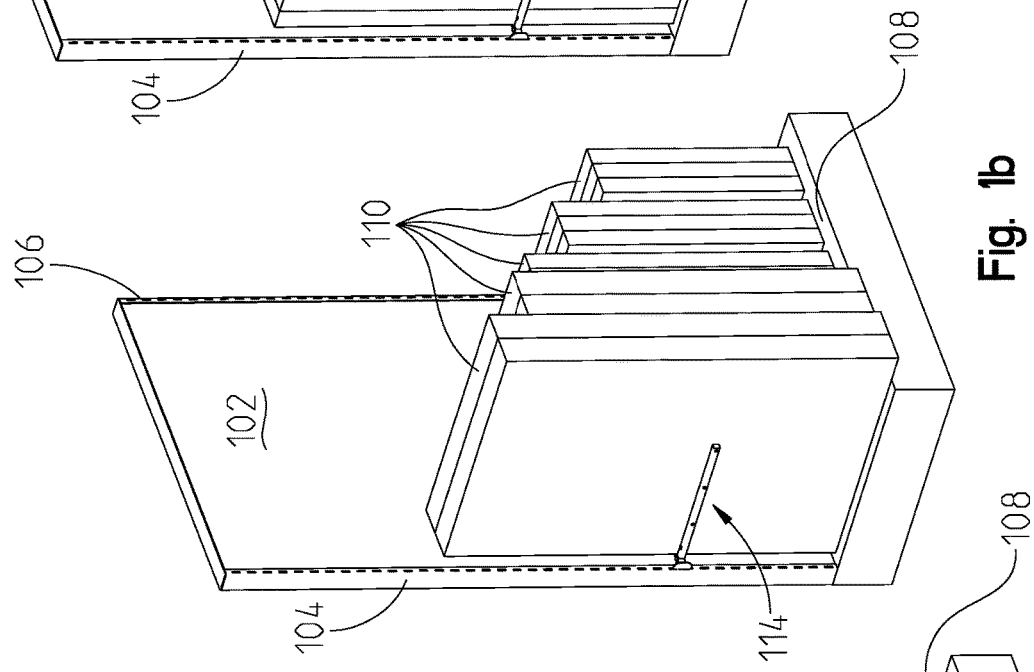
FIG. 1b is a perspective view of another embodiment of a wall display apparatus displaying merchandise in a second configuration.
Figure 1A:
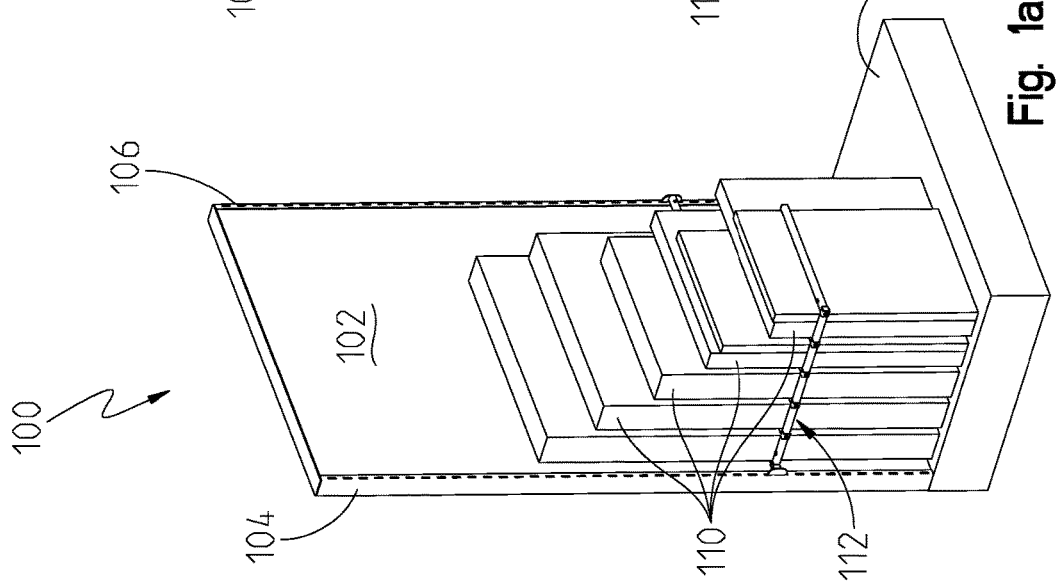
FIG. 1a is a perspective view of a wall display apparatus displaying merchandise in a first configuration.

Referring now to FIG. 1a, one embodiment of a five-slot display structure 100 is illustrated. The display structure 100 may have a display wall 102 with a first and second coupler rail 104, 106 coupled thereto. The display wall 102 may be a center wall along a display aisle or an end cap to a display aisle. Alternatively, the display wall 102 may be a perimeter wall to a room and not be part of an aisle at all. Accordingly, this disclosure considers embodiments of a display wall as part of any known display configuration such as aisles and perimeter walls to name a couple of non-exclusive examples.

The coupler rails 104, 106 may extend vertically from a base section 108 and have a plurality of slots defined thereon. The plurality of slots may be sized to at least partially receive mounting brackets therein to allow items to be displayed along the wall 102. The base section 108 may extend away from an outer surface of the display wall 102 to assist in maintaining an upright orientation of the wall 102. In on non-exclusive example, the base section 108 may be substantially perpendicular to the wall 102.

While the wall 102 is shown and described as coupled to a base section 108, also considered herein are embodiments where there is no base section 108 at all. More specifically, the wall 102 may be a structural wall that is part of a building or the like. In this configuration, the wall 102 is sufficiently strong to support the coupler rails 104, 106 and any display items coupled thereto because the wall is substantially interconnected with structural elements of the building. Accordingly, in this embodiment the base section 108 may be omitted.

In FIG. 1*a*, merchandise 110 is shown removably positioned along the wall 102 with a five-slot displaying apparatus 112. The displaying apparatus 112 may define five separate slotted sections that are sized to at least partially position merchandise 110 therein while allowing a user to remove the merchandise 110 from the display apparatus 112 as needed. In one aspect of the displaying apparatus 112 of FIG. 1A, the merchandise 110 may be oriented to be substantially parallel with the outer surface of the wall 102. In this configuration, the prominent display portion of the merchandise 110 may be facing the user as they walk beside or towards the wall 102.

Referring now to FIG. 1*b*, another embodiment of the present disclosure is illustrated. More specifically, a perpendicular display apparatus 114 is illustrated coupled to the wall 102. The perpendicular display apparatus 114 may be coupled to the first and second rails 104, 106 and define a plurality of slotted sections sized to receive merchandise therein. The plurality of slotted sections may be oriented to position the merchandise 110 to extend substantially perpendicularly from the surface of the wall 102. In this configuration, a user can easily view a plurality of merchandise models without requiring the user to manipulate the merchandise 110.

Referring now to FIG. 1*c*, a three-slot displaying apparatus 116 is illustrated. The three-slot displaying apparatus 116 may be substantially similar to the five-slot displaying apparatus 112 described above with the exception of defining two fewer slots. In one non-exclusive example, the three-slot displaying apparatus 116 may not extend as far away from the surface of the wall 102 compared to the five-slot displaying apparatus 112. Accordingly, the three-slot displaying apparatus 116 may accommodate areas with less space for a user to walk proximate to the wall 102.

Referring now to FIG. 2*a*, the five-slot displaying apparatus 112 is shown without merchandise 110 positioned therein. More specifically, FIG. 2*a* illustrates a wall support 202 coupled to and extending between the first and second rails 104, 106. The wall support 202 may have a first coupling section 204 configured to be removably coupled to the first rail 104 and a second coupling section 206 configured to be removably coupled to the second rail 106. Also coupled to the wall support 202 or to the first coupling section 204 may be an extension arm 208. The extension arm 208 may extend substantially perpendicularly from the surface of the wall 102.

The extension arm 208 may have sufficient structural properties to allow the extension arm 208 to be further coupled to a plurality of dividers 210 without substantially bowing or otherwise deflecting or breaking from the wall support 202 or first coupling section 204. The dividers 210 may each be removably coupled to the extension arm 208 and extend away from the extension arm 208 along separate planes that are each substantially parallel to the outer surface of the wall 102. Further, each divider 210 may be substantially level relative to an underlying ground or other underlying section of the wall 102.

In one aspect of the embodiment of FIG. 2*a*, the plurality of dividers 210 may be equally spaced from one another to define five substantially equally sized slots. Further, each slot may have an open end that is opposite the extension arm 208. Accordingly, in the embodiment of FIG. 2*a*, merchandise may be positioned in any one of the five slots of the displaying apparatus 112 by sliding the merchandise through the open end. Once positioned within the respective slot the adjacent dividers 210 may substantially restrict the merchandise from falling towards or away from the wall 102 (with the exception of the slot closest to the wall 102, wherein a divider is on one side of the merchandise while the wall support 202 and wall 102 are on the other side). Further, the base section 108 or other underlying surface may prevent the merchandise from falling out of the respective slots.

The displaying apparatus 112 may be repositionable along the rails 104, 106 to a plurality of different heights "H" relative to the base section 108. More specifically, the first and second coupling sections 204, 206 may be selectively coupled to corresponding slots of the rails 104, 106 to position the displaying apparatus 112 at a height H appropriate for the merchandise. In other words, the displaying apparatus 112 is repositionable along the rails 104, 106 to define a different height H for different types of merchandise.

Referring now to FIG. 2*b*, the perpendicular display apparatus 114 is illustrated with a plurality of dividers 210 extending from the wall support 202. The wall support 202 may be substantially the same in both the five-slot displaying apparatus 112 and the perpendicular display apparatus 114. However, the perpendicular displaying apparatus 112 may directly couple the dividers 210 to the wall support 202 rather than the extension arm 208. As a result, the merchandise displayed from the perpendicular display apparatus 114 may be oriented substantially 90 degrees offset relative to the wall 102 compared to the five-slot displaying apparatus 112.

The perpendicular displaying apparatus 114 may define any number of slots and have any number of dividers 210 positioned thereon. More specifically, the number of dividers and spacing there between may vary to accommodate different types of merchandise. Further, the height H of the perpendicular apparatus 114 may be adjustable in a similar way as described above for the five-slot displaying apparatus 112. Accordingly, merchandise may be directly slid into or out of the slots defined by the dividers 210 and held upright when positioned therein. This orientation provides easy access to the merchandise while efficiently utilizing the display space.

Referring now to FIG. 2*c*, the three-slot displaying apparatus 116 is illustrated without merchandise positioned therein. The three-slot displaying apparatus 116 may be substantially the same as the five-slot displaying apparatus 112 with the exception of fewer slots and a shortened extension arm 212. Accordingly, the three-slot displaying apparatus 116 may provide less of an intrusion into the aisle and be well suited for smaller spaces.

FIGS. 3*a*, 3*b*, and 3*c* may illustrate the corresponding displaying apparatuses 112, 114, 116 isolated from the rails 104, 106 and wall 102. As seen in these figures, the first and second coupling sections 204, 206 may be formed of a transversely extending section 302. The transversely extending section 302 may be sized to fit within a slot of the corresponding rails 104, 106. Further a base section 304 of the coupling sections 204, 206 may also be sized to fit in the corresponding rails 104, 106 and be positioned substantially opposite the transversely extending section 302.

To couple the displaying apparatuses to the rails, the coupling sections 204, 206 may be angled relative to the rails 104, 106 as the transversely extending sections 302 are positioned within the slots of the rails 104, 106. Then, the coupling sections 204, 206 may pivot to a substantially adjacent position wherein the base section 304 contacts and rests upon an underlying segment of the corresponding rail 104, 106. In this position, gravity may act on the displaying apparatus 112, 114, 116 and the transversely extending sections 204, 206 may substantially restrict the displaying apparatus from pivoting downward through contact with the rail 104, 106. Similarly, the base section 304 may contact the underlying portion of the rail 104, 106 to substantially restrict the displaying apparatus from sliding there along.

Figure 4A:
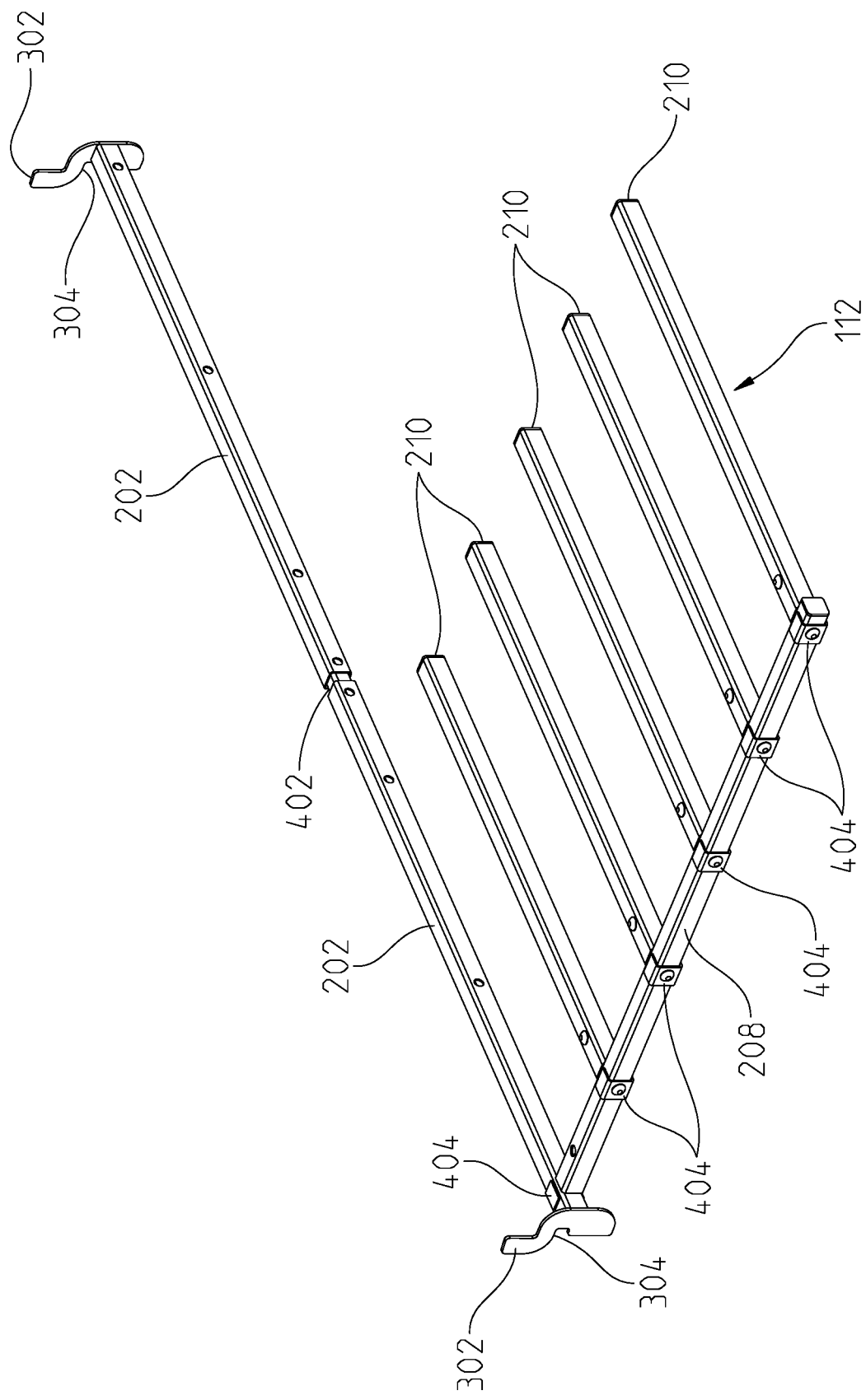
Figure 4B:
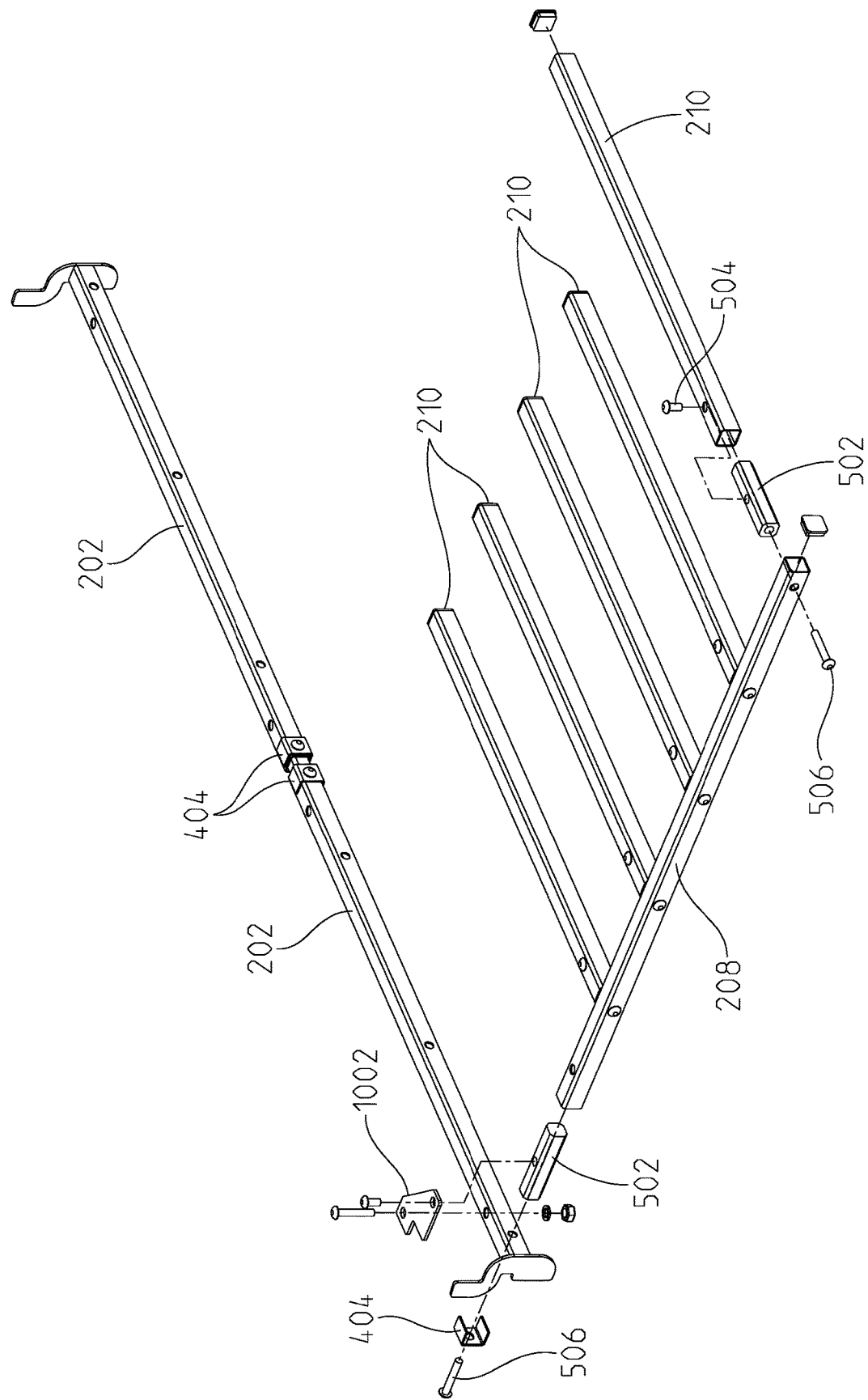
FIG. 4b is a detailed view of the spacer assembly of FIG. 4a shown with several components spaced from one another.

Referring now to FIGS. 4a and 4b, the five-slot displaying apparatus 112 is shown in more detail. More specifically, an extension support 402 is illustrated at a mid-section of the wall support 202. The extension support 402 may be sized to fit within an inner portion of the wall support 202 and be coupled thereto to provide a single substantially linear wall support 202. In other words, the wall support 202 may be formed of two separate members that are coupled to one another at a mid-section with the extension support 402.

Further still, each of the dividers 210 may be coupled to the extension arm 208 with an enforcement member 404. The enforcement member 404 may be a substantially U-shaped member that is positioned between the head of a fastener and against the surface of the extension arm 208. In one aspect of this disclosure, the extension arm 208 has a plurality of through holes positioned there along at locations that correspond with the location of the dividers 210. In this configuration, an enforcement member 404 may be positioned at each through hole and a fastener may be positioned there through to couple the dividers 210 to the extension arm 208.

Figure 5:
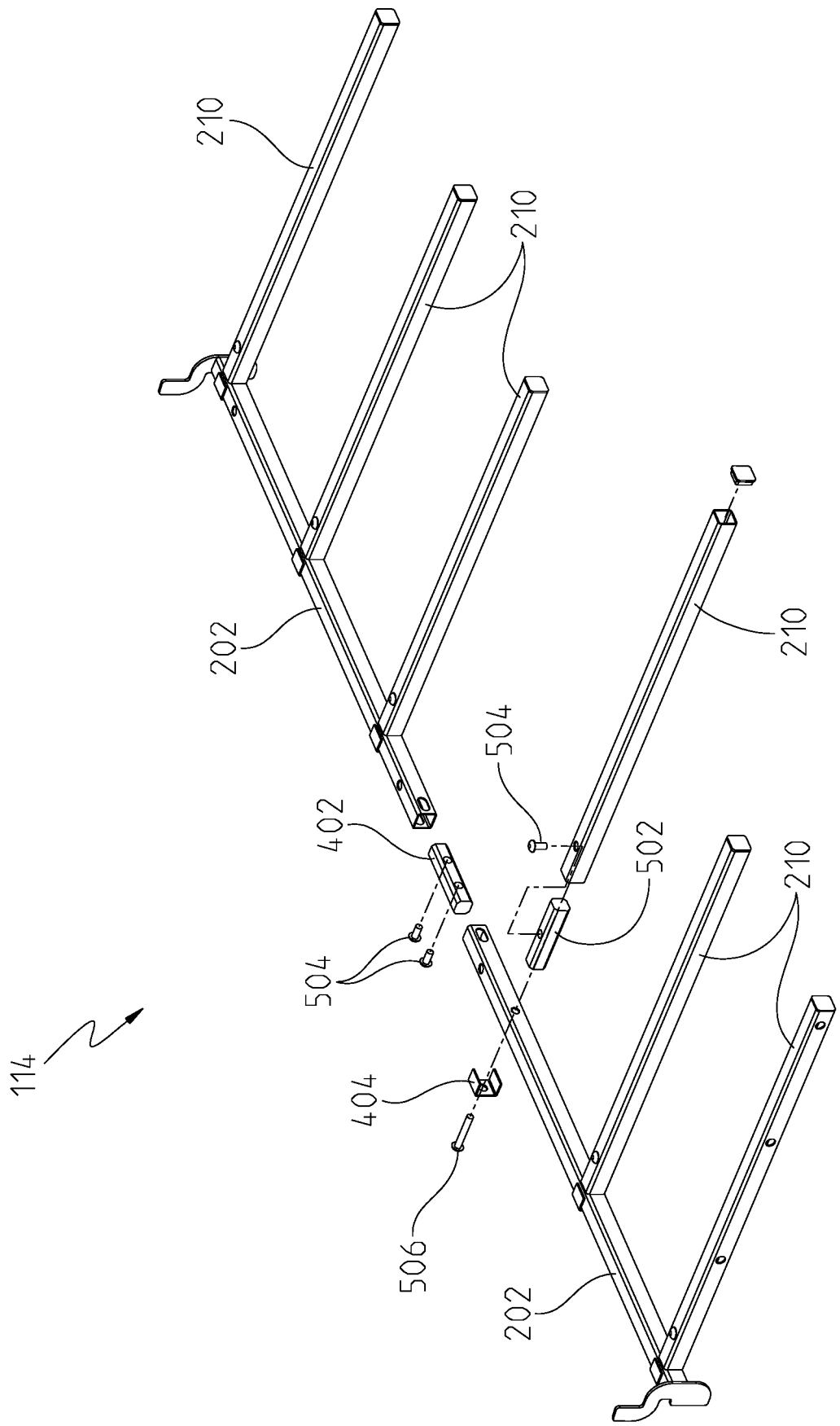
FIG. 5 is a detailed exploded view of the spacer assembly of FIG. 1b.

Referring now to FIG. 5, a coupling configuration for the dividers 210 is more clearly illustrated. While FIG. 5 illustrates the perpendicular displaying apparatus 114, this disclosure considers applying the teachings described herein to any of the display apparatuses 112, 114, 116. More specifically, each divider 210 may have a divider base 502 that is sized to fit at least partially within an internal cavity of the divider 210. The divider base 502 may define a coupling location for a surface fastener 504 along with a coupling location for a longitudinal fastener 506.

The longitudinal fastener 506 may be positioned through the enforcement member 404, through a through hole in the wall support 202 or extension arm 208, 212, and into the divider base 502. Further, the divider base 502 may be at least partially positioned within the corresponding divider 210 until a surface through hole defined through a portion of the divider 210 is aligned with a corresponding coupling location on the divider base 502. Then the surface fastener 504 may be coupled to the divider base 502 through the surface through hole to couple the divider 210 to the corresponding member 202, 208, 212.

Figure 10:
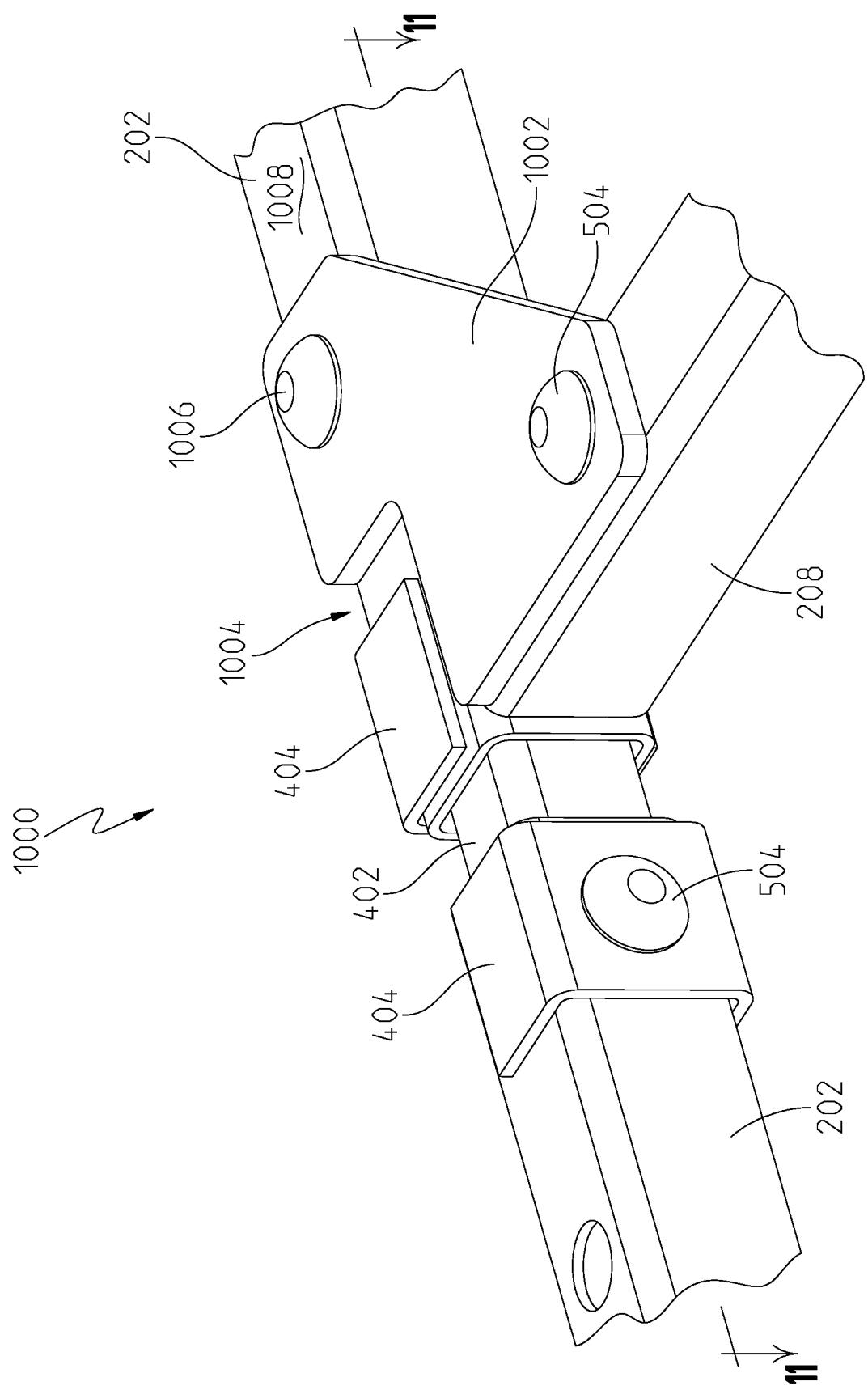
FIG. 10 is a partial view of a joint of a spacer assembly.
Figure 11:
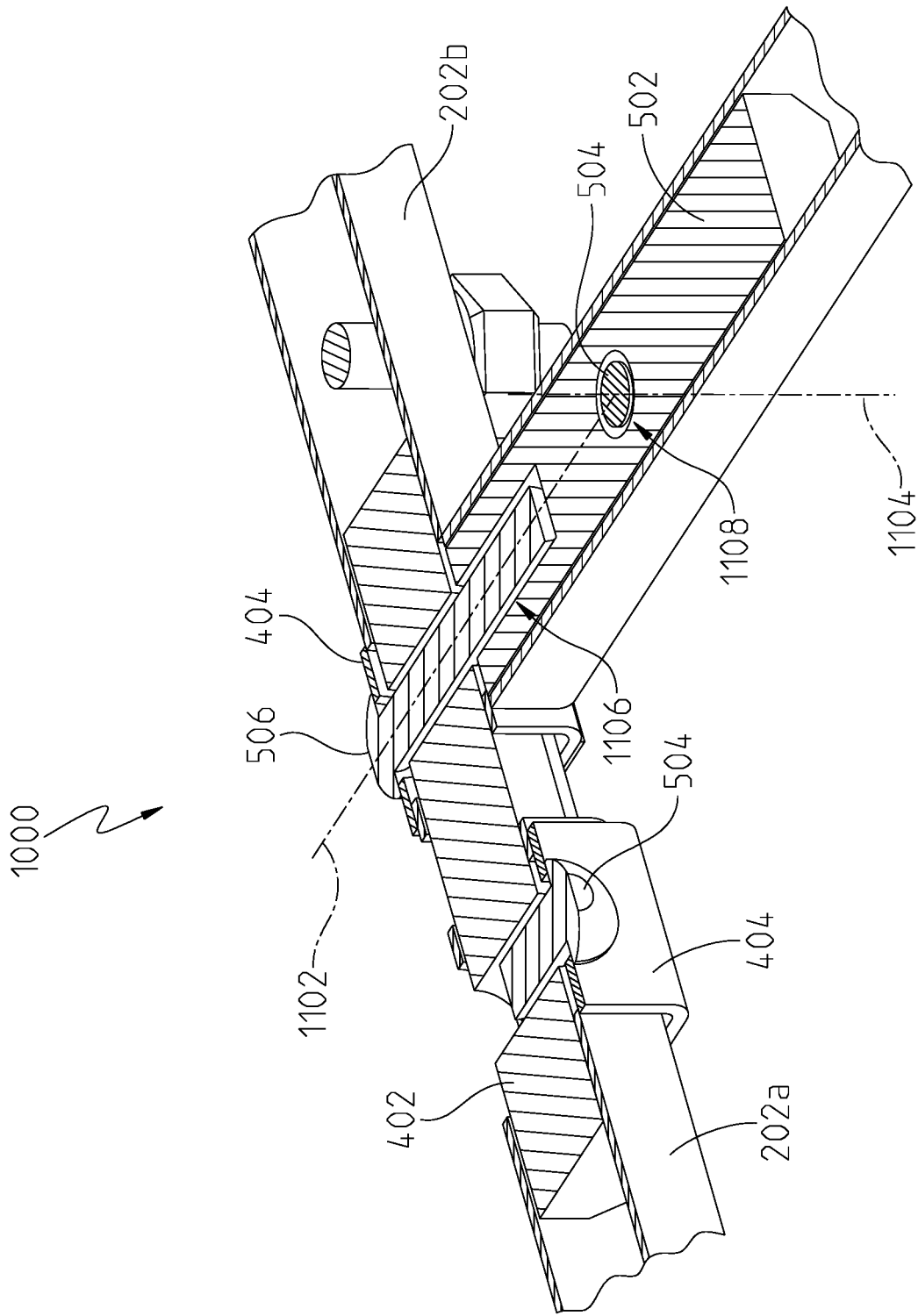
FIG. 11 is a section view of the joint of FIG. 10.

Referring now to FIGS. 10 and 11, a reinforcement plate 1002 is illustrated reinforcing the joint between the extension arm 208 and the wall support 202 along an extension arm coupling location 1000. The extension arm coupling location 1000 may be on an outer end of the wall support 202 or along an inner portion thereof. Alternatively, the extension arm coupling location 1000 may be located along the wall support 202 at any point between the outer end and the inner portion of the wall support 202.

FIGS. 10 and 11 further illustrate the reinforcement plate 1002 having a first end spaced to allow a surface fastener 504 to pass there through to thereby couple the first end of the reinforcement plate 1002 to the extension arm 208. Similarly, a second end of the reinforcement plate 1002 may be coupled to the wall support 202 with a reinforcement fastener 1006. In this configuration, the reinforcement plate may provide additional structural rigidity to the joint where the extension arm 208 is coupled to the wall support 202.

In one aspect of this disclosure, an enforcement member 404 may be positioned between a head of the longitudinal fastener 506 and the adjacent wall support 202 as discussed herein. Further, the enforcement member 404 may have a substantially U-shaped cross section wherein a portion of the enforcement member 404 is positioned on a top side 1008 of the wall support 202. Similarly, the reinforcement plate 1002 may be coupled along the top side 1008 of the wall support 202. In this configuration, the reinforcement plate 1002 may have a cutout section 1004 defined therein. The cutout section 1004 may be sized to correspond with the portion of the enforcement member 404 positioned along the top side 1008 to ensure the reinforcement plate 1002 does not substantially contact the enforcement member 404 when both the reinforcement plate 1002 and the enforcement member 404 are coupled to the wall support 202.

Referring now to FIG. 11, a partial section view of the extension arm coupling location 1000 is illustrated. More specifically, a first section 202a of the wall support 202 is illustrated coupled to a second section 202b of the wall support section 202 with the extension support 402. The extension support 402 may be positioned within a cavity of the corresponding sections 202a, 202b of the wall support 202 and coupled thereto by fasteners 504, 506. More specifically, the sections 202a, 202b may be formed as a substantially tubular section wherein the extension support 402 may be positioned at least partially within the inner cavity of the tubular sections 202a, 202b. In one aspect of this disclosure, the surface fastener 504 may extend through an enforcement member 404, through a hole in a wall of the second section 202a, and be threadably coupled to the extension support 402.

The second section 202b may be coupled to the extension support 402 with a longitudinal fastener 506 that further couples a divider base 502 of the extension arm 208 to the second section 202b. That is to say, the longitudinal fastener 506 may both couple the second section 202b to the extension support 402 and the divider base 502 to provide a substantially rigid extension arm coupling location 1000. In one aspect of this disclosure, the longitudinal fastener 506 may extend along a longitudinal axis 1102 to a partial through hole 1106 defined in the divider base 502. The longitudinal fastener 506 may be threadably coupled to the partial through hole 1106 to allow tightening of the longitudinal fastener 506 to simultaneously coupled the second section 202b to the extension arm 208 through the divider base 502 and to the first section 202a through the extension support 402.

In one aspect of this disclosure, the divider base 502 may also define a transverse through hole 1108 at least partially there through. The transverse through hole 1108 may be defined along a transverse axis 1104 that is substantially perpendicular to the longitudinal axis 1102. Further, the transverse through hole 1108 may define a threaded inner surface that allows the surface fastener 504 to be threadably coupled thereto.

While the divider base 502 is illustrated in conjunction with the extension support 402 in FIG. 11, similar coupling techniques can be applied without locating the divider base 502 adjacent to the extension support 402. In other words, the divider base 502 may be used to couple any of the dividers 210 to either the wall support 202 or the extension arm 208 utilizing the longitudinal fastener 506 and surface fastener 504 as discussed herein with reference to FIG. 11. Accordingly, any perpendicular coupling of members discussed herein may be implemented utilizing the divider base 502 and fasteners 504, 506.

Figure 6:
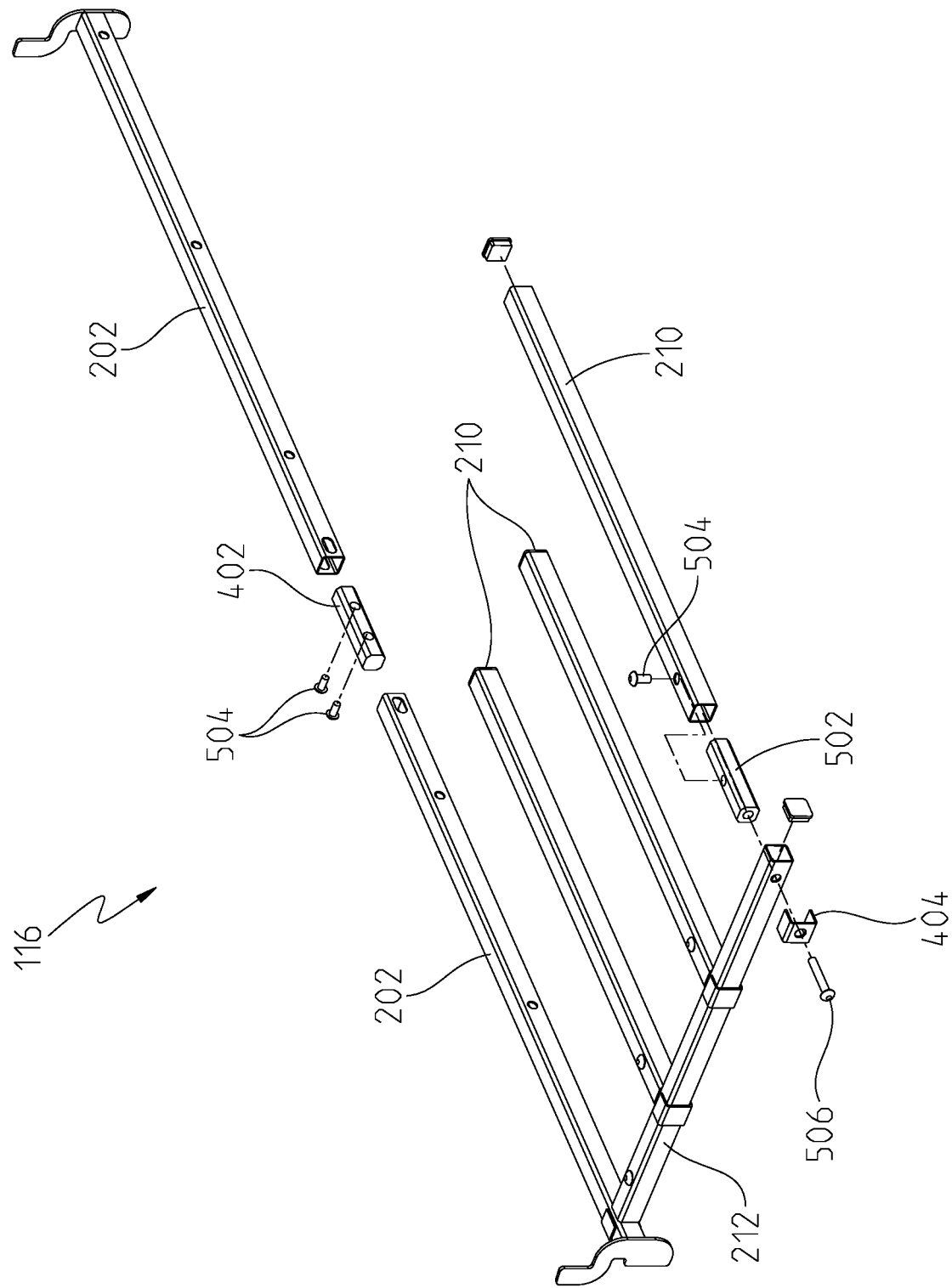
FIG. 6 is a detailed exploded view of the spacer assembly of FIG. 1c.
Figure 7:
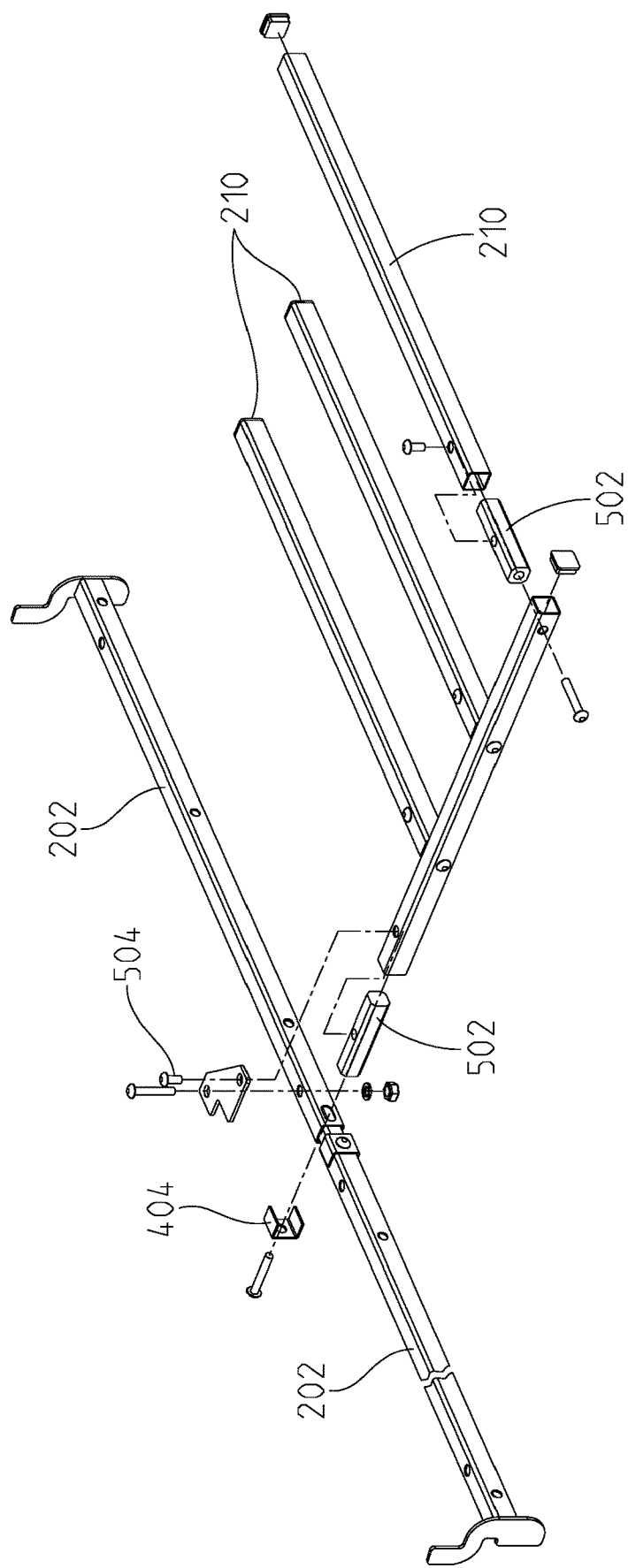
FIG. 7 is a detailed exploded view of another orientation of the spacer assembly of FIG. 1c.
Figure 8:
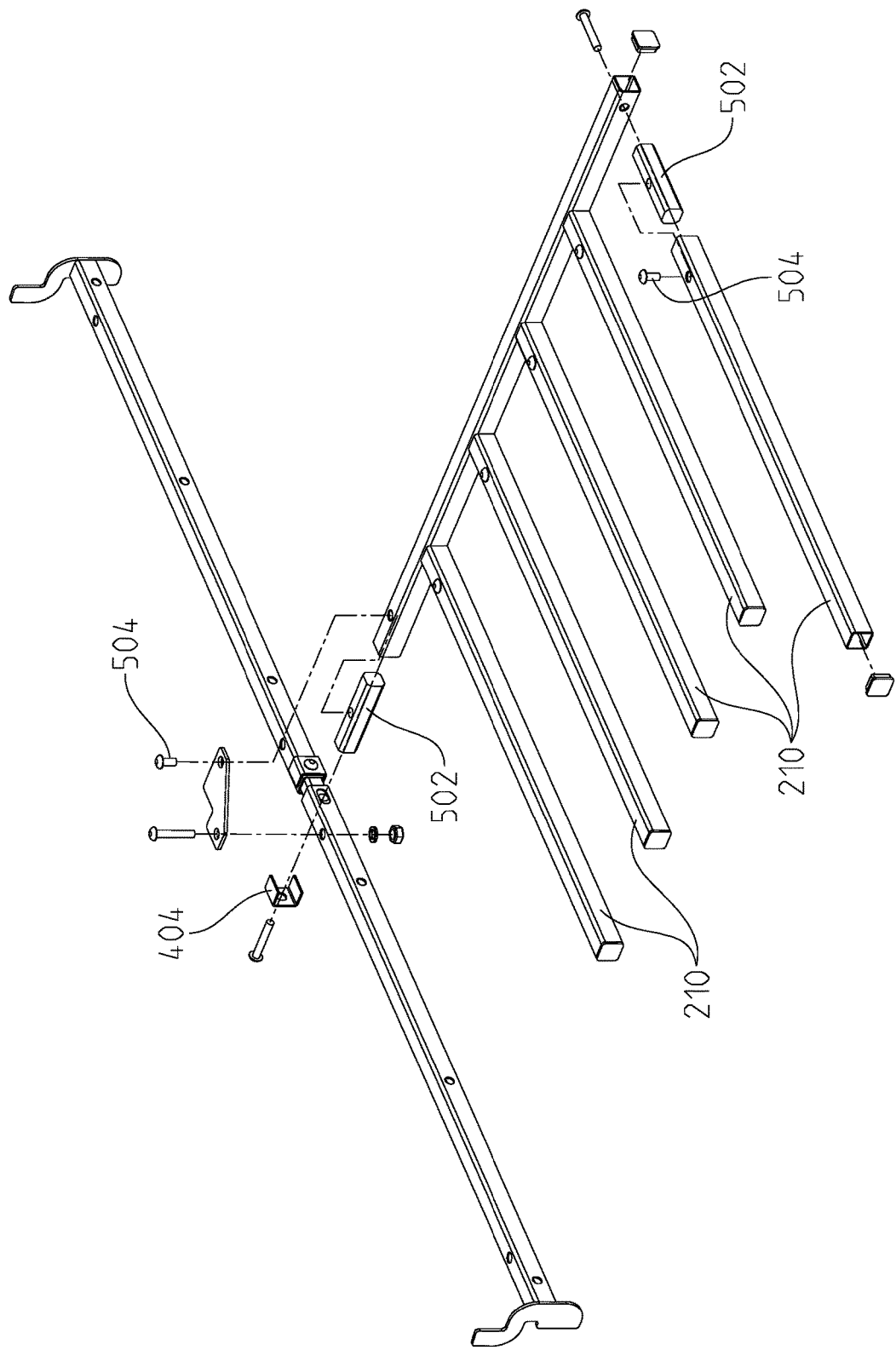
FIG. 8 is a detailed exploded view of a spacer assembly in a second orientation.

The extension support 402 may couple the sections 202a, 202b of the wall support 202 to one another in a similar manner as the divider base 502 except it may not have a longitudinal fastener. Alternatively, the extension support 402 and divider base 502 may be substantially the same. The divider base 502 may have two surface fasteners 504 positioned through the corresponding portions of the wall support 202. FIGS. 6 and 7 illustrate how similar details are applied to the five and three-slot displaying apparatus 112, 116 and the description of corresponding components above are hereby incorporated herein for these embodiments as well.

In one non-exclusive example of this disclosure, the wall support 202, extension arm 208, and dividers 210 may all be formed from substantially square tubing. Further still, the square tubing may have about a three-quarter inch square outer dimension. However, other shapes and types of tubing are also considered herein. More specifically, the tubing could be round or rectangular to name a few non-limiting examples.

In one aspect of this disclosure, the entire displaying apparatus 112, 114, 116 may be reduced to substantially linear components. For example, each of the dividers 210 may be removed from the corresponding extension arm 208, 212 or wall support 202. Further, the extension arms 208, 212 may also be removed from the wall support 202 utilizing the teachings of this disclosure. Further still, the wall support 202 may be reduced in length by removing the extension support 402.

In yet another aspect of this disclosure, the wall support 202, extension arms 208, 212, and dividers 210 may come in a kit that is configured to be oriented in any of the display apparatuses 112, 114, 116 shown herein. While the five and three-slot display apparatuses 112, 116 are illustrated herein as defining slots with openings facing towards the right as viewed in the drawings, this disclosure also contemplates embodiments wherein the slot openings face left (see FIGS. 9a-9i for several non-exclusive orientations considered for this disclosure). Accordingly, a user may receive a display apparatus kit and choose the orientation that is most appropriate for the particular aisle configuration.

Referring now to FIGS. 9a-9i, some of the many different configurations considered for this disclosure are illustrated. In one non-exclusive example of this disclosure, a single kit may have all of the components required to make each and every configuration illustrated in FIGS. 9a-9i. The kit may have sections 202a, 202b that can be coupled together with a provided extension support 402 to form the wall support 202 and further be coupled to a wall 102 utilizing known coupling techniques. The kit may also have extension arms 208, 212, a plurality of dividers 202, and a plurality of divider bases 502 along with all required corresponding fasteners 504, 506. Once the user obtains the kit, the user may select any of the configurations illustrated in FIGS. 9a-9i and assemble the kit to the desired configuration to display merchandise.

Figure 9A:
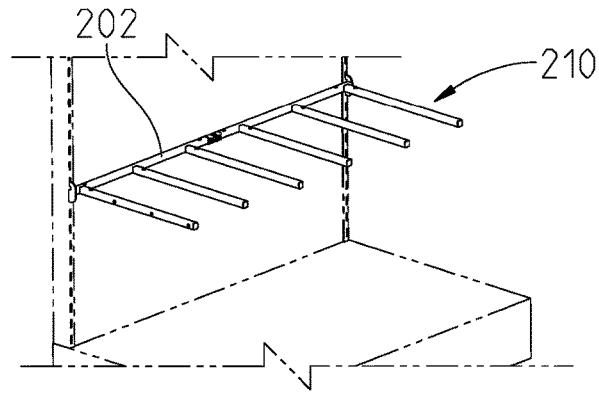
FIGS. 9a-9i show different orientations of a spacer assembly kit.
Figure 9B:
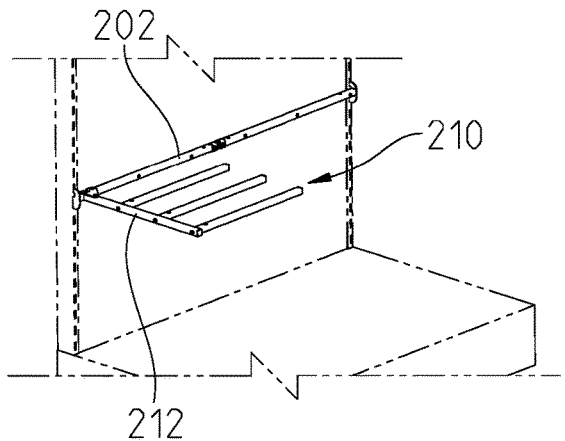
Figure 9C:
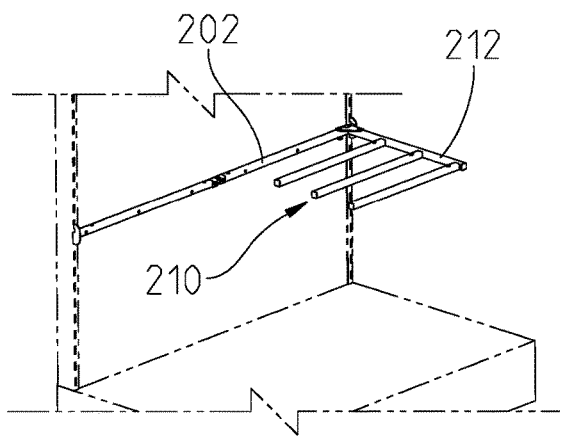
Figure 9D:
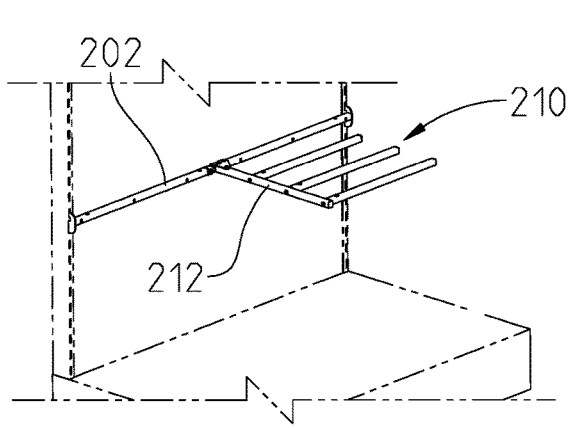
Figure 9E:
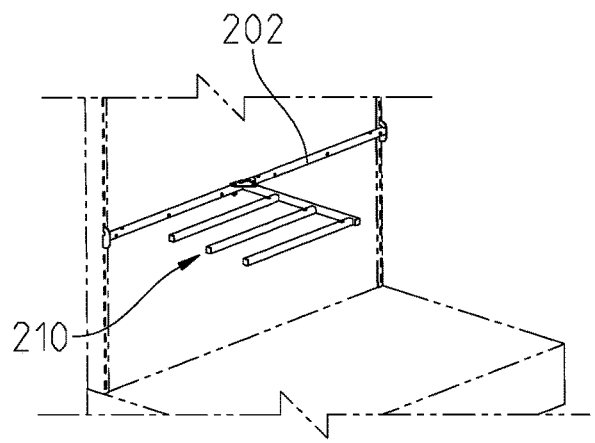
Figure 9F:
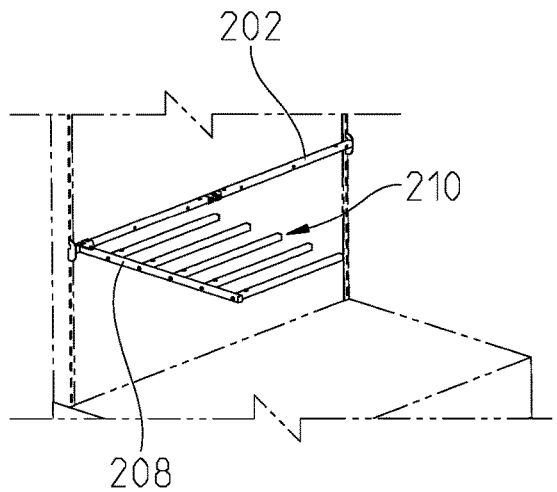
Figure 9G:
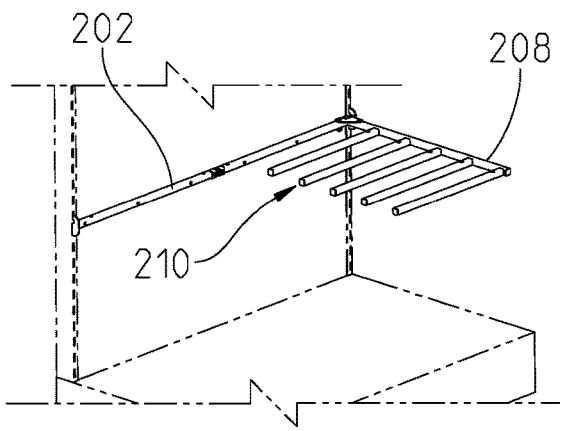
Figure 9H:
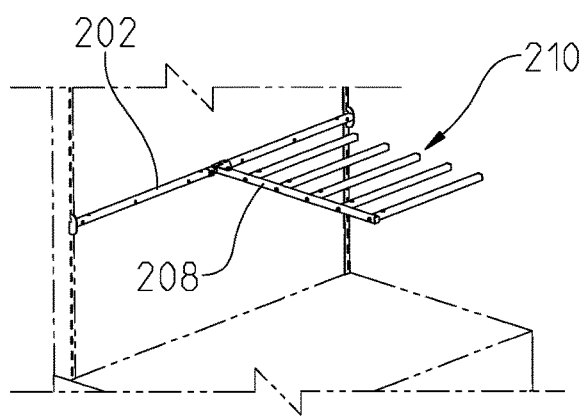
Figure 9I:
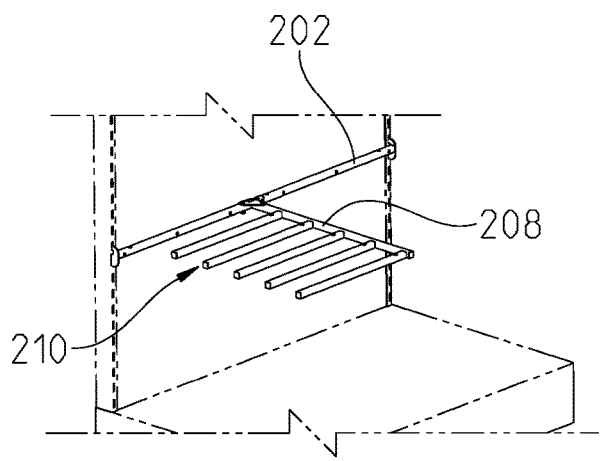

In one aspect of this disclosure, the kit may be assembled in a first configuration of FIG. 9a wherein each of the dividers 210 are coupled to the wall support 202 to extend perpendicularly therefrom and a second configuration of FIGS. 9b-9i wherein the dividers 210 are coupled to an extension arm 208, 212 so the dividers 210 extend substantially parallel to the wall support 202. Further still, the second configuration may have a plurality of orientations wherein the extension arm 208, 212 is coupled to the wall support 202 at different locations and facing different directions. As one non-exclusive example, FIGS. 9b, 9c, 9f, and 9g may illustrate a first orientation of the second configuration of the kit wherein the extension arms 208, 212 are extending away from the wall support 202 at end portions of the wall support.

Alternatively, in a second orientation illustrated in FIGS. 9d, 9e, 9h, and 9i, the extension arms 208, 212 may extend from the wall support 202 at a portion between the ends and face the dividers 210 in either a first or second direction. More specifically, the dividers 210 may be coupled to the extension arm 208, 212 at a through hole that extends entirely through the extension arm 208, 212. In this configurations, the dividers 210 can be positioned on either a first side of the extension arm facing the first direction or the second side of the extension arm facing the second direction. Accordingly, this disclosure contemplates providing a kit that allows the user to construct many different configurations for displaying merchandise.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations).

What is claimed is:

1. A display apparatus kit, comprising:
    a wall support configured to be selectively coupled to a wall;
    an extension arm configured to be selectively coupled to the wall support; and
    a divider having a tubular cross-section and configured to be coupled to the wall support or the extension arm;
    wherein, in a first configuration the divider is coupled to the wall support and extending away from the wall to define a slot between the extension arm and the divider and in a second configuration the divider is coupled to the extension arm and extending from the extension arm substantially parallel to the wall support;
    wherein the divider is coupled to the wall support with a divider base wherein a longitudinal through hole is defined along a longitudinal axis of the divider and a transverse through hole defined along a transverse axis of the divider base.

2. The display apparatus kit of claim 1, further wherein the divider is coupleable directly to the wall support or through the extension arm.

3. The display apparatus kit of claim 1, further wherein a fastener couples the divider base to the wall support through an enforcement member.

4. The display apparatus kit of claim 1, further wherein the divider is positionable in either a perpendicular configuration or a parallel configuration relative to the wall support.

5. The display apparatus kit of claim 1, further wherein the wall support has a first and second coupling section that are coupleable to a first and second rail of a wall.

6. A display assembly kit, comprising:
    a wall support section configured to be coupled to a wall;
    a plurality of tubular dividers;
    an extension arm; and
    an enforcement member positioned at least partially around the wall support section at an extension arm coupling location;
    wherein, the plurality of dividers are coupleable to the wall support section to extend perpendicularly therefrom to provide at least one slot between adjacent dividers in a first configuration;
    further wherein, the extension arm is coupleable to the wall support section to extend perpendicularly from the wall support section and the plurality of dividers are coupleable to the extension arm to extend from the extension arm to be substantially parallel to the wall support section to provide at least one slot between adjacent dividers in a second configuration;
    further wherein, at least one of the plurality of dividers is used in both the first configuration and the second configuration.

7. The display assembly kit of claim 6, further comprising a divider base that is positionable within, and coupleable to, the extension arm on one end, wherein a first fastener is positionable through the enforcement member and into the divider base to couple the extension arm to the wall support section.

8. The display assembly kit of claim 7, further comprising a second fastener that is positionable through a wall of the extension member and into the divider base to couple the extension member to the divider base.

9. The display assembly kit of claim 8, further wherein the first fastener and the second fastener define axes that are substantially perpendicular to one another when the first and second fastener are coupled to the divider base.

10. The display assembly kit of claim 6, further comprising a reinforcement plate that is coupleable to the extension arm on one end and to the wall support section on the other end, wherein the reinforcement plate has a cutout section and a portion of the enforcement member is located in the cutout section when the extension arm is coupled to the wall support section.

11. The display assembly kit of claim 6, further comprising:
    a divider base that is positionable within, and coupleable to, the extension arm on one end to couple the extension arm to the wall support section;
    a second fastener that is positionable through a wall of the extension member and into the divider base to couple the extension member to the divider base; and
    a reinforcement plate that is coupleable to the extension arm on one end and to the wall support section on the other end;
    wherein the reinforcement plate is coupleable to the extension arm with the second fastener.

12. The display assembly kit of claim 6, further wherein the second configuration has at least a first orientation and a second orientation, wherein the extension arm is coupleable to an end portion of the wall support section in the first orientation and the extension arm is coupleable to an inner section of the wall support section in a second orientation.

13. The display assembly kit of claim 12, further wherein the plurality of dividers are coupleable to either a first side or a second side of the extension arm when the extension arm is in the second orientation to position the at least one slot towards either the first side or the second side of the extension arm.

14. The display assembly kit of claim 6, further wherein the wall support section is comprised of a first section and a second section that are coupleable to one another at one end and coupleable to the wall at the other end, wherein the first a second section are coupleable to one another with an extension support.

15. The display assembly kit of claim 14, comprising:
    a divider base that is positionable within, and coupleable to, the extension arm on one end to couple the extension arm to the wall support section;
    a first fastener positionable through the wall support section and extension support and into the divider base to couple the extension arm to the wall support section;
    a second fastener that is positionable through a wall of the extension member and into the divider base to couple the extension member to the divider base; and a reinforcement plate that is coupleable to the extension arm on one end and to the wall support section on the other end;

wherein the reinforcement plate is coupleable to the extension arm with the second fastener.

16. A kit for assembling a display having slots positionable in multiple orientations, comprising:

a wall support section that is configured to be coupled to a substantially vertical surface;

an extension arm that is selectively coupleable to the wall support section; and a plurality of tubular dividers that are coupleable to either the wall support section or the extension arm; and a plurality of divider bases that are selectively coupleable to the dividers to provide a coupling location for the dividers and either the wall support section or the extension arm;

wherein, the plurality of dividers extend perpendicularly from the wall support section when coupled directly thereto to define at least one slot between adjacent dividers;

further wherein, the plurality of dividers extend substantially parallel to the wall support section when coupled to the extension arm to define at least one slot between adjacent dividers;

further wherein each divider base has a longitudinal partial through hole defined therein to receive a first fastener to couple the divider base to either the wall support section or the extension arm and a mid-section through hole defined therein to receive a second fastener to couple the divider base to the corresponding divider, the mid-section through hole being defined along an axis that is substantially perpendicular to a longitudinal axis defined by the longitudinal partial through hole.

17. The kit of claim 16, further wherein one of the plurality of divider bases selectively couples the extension arm to the wall support section.

* * * * *